US010630331B2

(12) United States Patent
Tanenbaum et al.

(10) Patent No.: US 10,630,331 B2
(45) Date of Patent: Apr. 21, 2020

(54) DEVICES FOR REFLECTING, DEFLECTING, AND/OR ABSORBING ELECTROMAGNETIC RADIATION EMITTED FROM AN ELECTRONIC DEVICE AND METHODS THEREFOR

(71) Applicant: Rowtan Technologies LLC, Lewes, DE (US)

(72) Inventors: William Charles Tanenbaum, Lewes, DE (US); Roger Kenneth Tanenbaum, Lewes, DE (US); Ivan Rothchild, Lewes, DE (US)

(73) Assignee: Rowtan Technologies LLC, Lewes, DE (US)

( * ) Notice: Subject to any disclaimer, the term of this patent is extended or adjusted under 35 U.S.C. 154(b) by 0 days.

(21) Appl. No.: 16/147,399

(22) Filed: Sep. 28, 2018

(65) Prior Publication Data

US 2019/0036564 A1    Jan. 31, 2019

Related U.S. Application Data

(63) Continuation-in-part of application No. 16/125,734, filed on Sep. 9, 2018, now Pat. No. 10,250,287, which is a continuation of application No. 15/721,525, filed on Sep. 29, 2017, now Pat. No. 10,141,968.

(60) Provisional application No. 62/368,397, filed on Jul. 29, 2016.

(51) Int. Cl.
*H04B 1/3827* (2015.01)
*H04B 1/03* (2006.01)
*H04M 1/02* (2006.01)

(52) U.S. Cl.
CPC .................... *H04B 1/3838* (2013.01)

(58) Field of Classification Search
CPC ....... H04B 1/3838; H04B 1/03; H04M 1/035; H04M 1/0283
See application file for complete search history.

(56) References Cited

U.S. PATENT DOCUMENTS

| | | |
|---|---|---|
| 5,338,896 A | 8/1994 | Danforth |
| 5,550,552 A | 8/1996 | Oxley |
| 5,726,383 A | 3/1998 | Geller et al. |
| 5,777,261 A | 7/1998 | Katz |
| 5,787,340 A | 7/1998 | Sepponen |
| 5,826,201 A | 10/1998 | Gratias |
| 6,359,213 B1 | 3/2002 | Long |
| 6,576,832 B2 | 6/2003 | Svarfvar et al. |
| 6,603,981 B1 | 8/2003 | Carrillo, Jr. et al. |
| 6,711,387 B1 | 3/2004 | Lungley |
| 6,855,883 B1 | 2/2005 | Matsui |
| 7,327,841 B2 | 2/2008 | Schreiber et al. |

(Continued)

FOREIGN PATENT DOCUMENTS

WO    1997049191 A1    12/1997

*Primary Examiner* — Andrew Wendell
(74) *Attorney, Agent, or Firm* — Adam R. Stephenson, Ltd (57) ABSTRACT

Devices used with mobile electronic devices. Implementations may include: a metal-containing plate configured to be directly attached to a rear surface of a mobile electronic device where the metal-containing plate includes a coating. The metal-containing plate may be configured to deflect, absorb, or reflect electromagnetic radio frequency radiation emitted by the mobile electronic device away from a user of the mobile electronic device.

12 Claims, 8 Drawing Sheets

(56) References Cited

U.S. PATENT DOCUMENTS

| | | |
|---|---|---|
| 8,208,980 B2 | 6/2012 | Wong et al. |
| 8,214,003 B2 | 7/2012 | Wong et al. |
| 8,442,602 B2 | 5/2013 | Wong et al. |
| 8,750,948 B2 | 6/2014 | Wong et al. |
| 8,897,843 B2 | 11/2014 | Wong et al. |
| 8,957,813 B2 | 2/2015 | McCaughey et al. |
| 9,112,584 B2 | 8/2015 | McCaughey et al. |
| 9,155,367 B2* | 10/2015 | Fathollahi ............... A45C 11/00 |
| 9,472,841 B2 | 10/2016 | Wong et al. |
| 10,141,968 B2* | 11/2018 | Tanenbaum ......... H04B 1/3838 |
| 10,250,287 B2* | 4/2019 | Tanenbaum ......... H04B 1/3838 |
| 2002/0009976 A1 | 1/2002 | Rashidi |
| 2010/0234081 A1 | 9/2010 | Wong et al. |
| 2011/0021255 A1 | 1/2011 | Kim et al. |
| 2012/0242549 A1 | 9/2012 | Wong et al. |
| 2012/0309472 A1 | 12/2012 | Wong et al. |
| 2013/0122975 A1* | 5/2013 | Ha ........................... G21F 3/00 |
| | | 455/575.5 |
| 2014/0228081 A1 | 8/2014 | Chang |
| 2016/0072933 A1 | 3/2016 | Cox, III |
| 2016/0309010 A1 | 10/2016 | Carnevali |
| 2016/0360652 A1 | 12/2016 | McConnell |
| 2017/0134065 A1 | 5/2017 | Cramer |
| 2017/0207811 A1 | 7/2017 | Brisco et al. |

* cited by examiner

DEVICES FOR REFLECTING, DEFLECTING, AND/OR ABSORBING ELECTROMAGNETIC RADIATION EMITTED FROM AN ELECTRONIC DEVICE AND METHODS THEREFOR

CROSS REFERENCE TO RELATED APPLICATIONS

This document claims the benefit of the filing date of U.S. Provisional Patent Application 62/368,397, entitled "Powder-coated, three-inch by two-inch piece of copper that deflects and absorbs electromagnetic radiation emitted from cellphones" to Tanenbaum et al. which was filed on Jul. 29, 2016, the disclosure of which is hereby incorporated entirely herein by reference.

This application is also a continuation-in-part application of the earlier U.S. Utility patent application to Tanenbaum et al., application Ser. No. 16/125,734, filed Sep. 9, 2018, which is a continuation application of the earlier U.S. Utility patent application to Tanenbaum et al. entitled "Device for Reflecting, Deflecting, and/or Absorbing Electromagentic Radiation Emitted from an Electronic Device and Method Therefor," application Ser. No. 15/721,525, filed Sep. 29, 2017, now pending, the disclosures of each of which are hereby incorporated entirely herein by reference.

BACKGROUND

1. Technical Field

Aspects of this document relate generally to electronic devices. More specific implementations involve accessories for portable electronic devices.

2. Background

Portable electronic devices that have wireless communication capability utilize radios (transceivers) that utilize electromagnetic radiation of various frequencies to transfer information, such as data and voice communication. The electromagnetic radiation is emitted and received using an antenna coupled with the radio. Some portable electronic devices utilizes multiple radios and corresponding antennas to transmit using multiple frequencies.

SUMMARY

Implementations of devices used with mobile electronic devices may include: a metal-containing plate configured to be directly attached to a rear surface of a mobile electronic device where the metal-containing plate includes a coating. The metal-containing plate may be configured to deflect, absorb, or reflect electromagnetic radio frequency radiation emitted by the mobile electronic device away from a user of the mobile electronic device.

Implementations of mobile electronic devices may include one, all, or any of the following:

The metal-containing plate may be smaller than, substantially coextensive with, or the same dimension as a perimeter of the rear surface of the mobile electronic device.

The metal-containing plate may include a perimeter that forms any closed shape.

The metal-containing plate may include a non-planar surface on a largest surface of the metal-containing plate.

The metal-containing plate may include a material selected from the group consisting copper, gold, silver, platinum, nickel, aluminum, ferrite, shungite, any radio frequency attenuating, absorbing, or reflecting material, or any combination thereof.

The coating may be selected from the group consisting of an electroplated coating, an electroless plated coating, a paint including a wet or dry carrier, a rubber coating, a metal coating, a metal filing coating, a magnetic coating, a clear coating, a ceramic coating, a powder coating, or any combination thereof.

The metal-containing plate may include two or more layers where one of the two or more layers may be either a metallic material or a non-metallic material and a second one of the two or more layers is either a non-metallic material or a metallic material.

The device may further include a coupling mechanism on the metal-containing plate where the coupling mechanism is configured to couple the metal-containing plate directly to the rear surface of the portable electronic device. The coupling mechanism may be selected from the group consisting of an adhesive, hook and loop fasteners, screws, snaps, double sided tape, polymers, suction cups, magnetics, or any combination thereof.

Implementations of a device used with a mobile electronic device may include a plate configured to be directly attached to a rear surface of a mobile electronic device or coupled between a cover and the rear surface of the mobile electronic device. The plate may include at least two portions. A material of at least one of the at least two portions of the plate may be configured to deflect, absorb, or reflect electromagnetic radio frequency radiation emitted by the mobile electronic device away from a user of the mobile electronic device.

Implementations of devices used with a mobile electronic device may include one, all, or any of the following:

The plate may include at least two metal-containing portions.

The at least two portions of the plate may be coupled together through a non-metallic portion or metallic portion.

The non-metallic portion may be selected from the group consisting of a binder, a support, a plastic support, a rubber support, a polymer support, a wood support, a carbon fiber support, a resin support, a glass reinforced epoxy laminate support, an adhesive, a glue, a molding compound, and any combination thereof.

The device may further include a coating which may be selected from the group consisting of an electroplated coating, an electroless plated coating, a paint including a wet or dry carrier, a rubber coating, a ceramic coating, a metal coating, a metal filing coating, a magnetic coating, a clear coating, a powder coating, or any combination thereof.

At least one of the at least two portions of the plate may include two or more layers where one of the two or more layers is either a metallic material or a non-metallic material and a second one of the two or more layers is either a non-metallic material or a metallic material.

Implementations of a device used with a mobile electronic device may include a plate configured to be directly attached to a rear surface of a mobile electronic device or coupled between a cover and the rear surface of the mobile electronic device. The plate may include a mesh. A material of the mesh may be configured to deflect, absorb, or reflect electromagnetic radio frequency radiation emitted by the mobile electronic device away from a user of the mobile electronic device.

Implementations of devices used with a mobile electronic device may include one, all, or any of the following:

The mesh may include a plurality of substantially perpendicularly oriented members.

The mesh may include a plurality of spaced closed shaped openings through the material.

The device may include a coupling mechanism on the plate. The coupling mechanism may be configured to couple the plate directly to the rear surface of the portable electronic device. The coupling mechanism may be selected from the group consisting of an adhesive, hook and loop fasteners, screws, snaps, double sided tape, polymers, suction cups, magnetics, or any combination thereof.

The plate may include two or more layers where one of the two or more layers may be either a metallic material or a non-metallic material and a second one of the two or more layers is either a non-metallic material or a metallic material.

One of the two or more layers that is a metallic material may be the mesh.

Implementations of device for deflecting RF radiation away from a user of a mobile phone may include a metallic plate configured to be positioned between the mobile phone and at least one of a decorative or protective cover. The metallic plate may be positioned over a rear surface of the mobile phone. The metallic plate may be removable and non-permanently attached to the mobile phone and the at least one of a decorative or protective cover. The metallic plate may include a copper plate and a powder coating formed over the copper plate.

Implementations of devices for deflecting RF radiation away from a user of a mobile phone may include one, all, or any of the following:

The copper plate may be configured to cover an entire area of the rear surface of the mobile phone.

The metallic plate may include a clear coat formed over the powder coating.

The metallic plate may include a slip resistant material applied to at least one surface of the clear coat.

The metallic plate may include indicia formed on the powder coating.

The copper plate may have undulating edges.

The copper plate may have sawtooth edges.

The copper plate may have a thickness of $\frac{1}{32}$ to $\frac{1}{8}$ inches.

Implementations of a device for deflecting electromagnetic RF radiation away from a user of a mobile device may include a metallic plate configured to be positioned between the mobile phone and a cover portioned over a rear surface of the mobile phone. The metallic plate may be removable and non-permanently attached to the mobile phone and the cover. The metallic plate may include a copper plate configured to cover the rear surface of the mobile phone where RF signals are radiating from the mobile phone when the mobile phone is receiving/transmitting RF signals. A powder coating may be formed over the copper plate.

Implementations of a device for deflecting electromagnetic RF radiation away from a user may include one, all, or any of the following:

The metallic plate may include a clear coat formed over the powder coating.

The metallic plate may include a slip resistant material applied to at least one surface of the clear coat.

The metallic plate may include indicia formed on the powder coating.

The copper plate may have undulating edges.

The copper plate may have sawtooth edges.

The copper plate may have a thickness of $\frac{1}{32}$ to $\frac{1}{8}$ inches.

Implementations of a device for deflecting RF radiation away from a user of a mobile phone may include a metallic plate configured to be positioned between the mobile phone and a cover portioned over a rear surface of the mobile phone, wherein the metallic plate is removable and non-permanently attached to the mobile phone and the cover. The metallic plate may include a copper plate configured to cover the rear surface of the mobile phone where RF signals are radiating from where the mobile phone is receiving/transmitting RF signals. A powder coating may be formed over the copper plate. A clear coat may be formed over the powder coating. A slip resistant material may be applied to at least one surface of the clear coat.

Implementations of a device for deflecting electromagnetic RF radiation may include one, all or any of the following:

The metallic plate may include indicia formed on the powder coating.

The copper plate may have undulating edges.

The copper plate may have sawtooth edges.

The copper plate may be rectangular in shape.

Implementations of a device used with a mobile electronic device may include a metallic plate configured to be disposed between the mobile electronic device and a cover. The metallic plate may have a coating. The device may deflect electromagnetic RF radiation away from the user of the mobile electronic device.

Implementation of a device used with a mobile electronic device may include one, all, or any of the following:

The device may be rectangular in shape.

The device may be non-rectangular in shape.

The device may be shaped like a credit card and sized to cover at least a portion of the rear surface of the mobile electronic device.

The device may be removably coupled to at least one of the mobile electronic device or the cover.

The device may include at least one aperture.

The cover may be positioned over at least a portion of the device and at least a portion of a rear surface of the mobile electronic device.

The device may be dimensioned to cover at least a portion of an antenna of the mobile electronic device.

The device may be configured to cover at least a portion of a rear surface of the mobile electronic device adjacent to an antenna of the mobile electronic device.

The device is positioned to cover at least a portion of an area of the mobile electronic device emitting electromagnetic radiation.

The device may have an edge of a form selected from the group consisting of at least one of a straight, curved, wave, undulating, or sawtoothed.

The device may be sized proportional to the size of the mobile electronic device.

Implementations of a device used with a mobile phone may include a metallic plate configured to be disposed between the mobile phone and a cover. The metallic plate may have a coating. The cover may be positioned over at least a portion of the device. The device may deflect electromagnetic RF radiation away from the user of the mobile phone.

Implementations of a device used with a mobile phone may include one, all, or any of the following:

The device may be rectangular in shape.

The device may be a non-rectangular shape.

The device may be shaped like a credit card and sized to cover at least a portion of the rear surface of the mobile phone.

The device may be removably coupled to at least one of the mobile phone or the cover.

The device may include at least one aperture.

The cover may be positioned over at least a portion of a rear surface of the mobile phone.

The device may be dimensioned to cover at least a portion of an antenna of the mobile phone.

The device may be positioned to cover at least a portion of an a rear surface of the mobile phone adjacent to an antenna of the mobile phone.

The device may be configured to cover at least a portion of an area of the mobile phone emitting electromagnetic radiation.

The device may have an edge of a form selected from the group consisting of at least one of a straight, curved, wave, undulating and sawtoothed.

The device may be sized proportional to the size of the mobile phone.

Implementations of a device for deflecting electromagnetic radiation away from a user of a mobile device may include a metallic plate deflecting electromagnetic radiation away from the user of the mobile electronic device and a coating covering the metallic plate.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended devices for reflecting, deflecting, and/or absorbing electromagnetic radiation emitted from a mobile electronic device and related methods will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such devices for reflecting, deflecting, and/or absorbing electromagnetic radiation emitted from a mobile electronic device and related methods, and implementing components and methods, consistent with the intended operation and methods.

Mobile phones transmit and receive data wirelessly through communication networks such as a local area network (LAN), a general wide area network (WAN), and/or a public network. To communicate with these networks, antennas within these mobile phones receive and radiate Radio Frequency (RF) signals. Once the mobile phone is activated, the mobile phone is constantly transmitting and receiving RF electromagnetic frequency signals.

Many mobile phones are held close to the user's bodies and/or heads when in use. For example, when talking on a mobile phone, the user may hold the mobile phone close to the user's head/ear/brain/eyes. Many users store and hold their mobile phones in their pocket next to their body. Thus, the antennas of the mobile phones that radiate the RF electromagnetic frequency signals may lead to greater exposure and absorption of radiation by the users head and body.

Studies have been conducted and continue to be conducted regarding the health concerns of RF electromagnetic frequency signals being radiated from mobile phones. These studies have focused on the negative long term effects of radiation on people and its medical complications. Some study results have shown that the penetration level of radiation is more dangerous and has more negative health effects in children than adults. Children's nervous systems are still developing and, therefore, more vulnerable to factors that may be possibly carcinogenic. Their heads are smaller than those of adults and they have thinner brain tissues and bones and consequently have a greater proportional exposure to the field of radiofrequency radiation that is emitted by mobile phones. Children also have the potential of accumulating more years of mobile phone exposure than adults. Several studies are currently being conducted regarding the potential health effects of radiation on brain electrical activity, joint pain, heart rate, blood pressure, immune system, possible carcinogenic affects. The World Health Organization has classified mobile phone radiation as a Class 2B Possible Carcinogen.

Because of the potential effect of radiation from mobile phones, the Federal Communications Commission (FCC) requires limiting the radiation from a portable communication device (such as a mobile or cellular telephone) that is directed towards a user's head (Specific Absorption Rate, or SAR). Further, warnings are placed inside the boxes of all mobile phone instruction booklets warning users to keep mobile phones certain distances away from the users' head and bodies due to the harmful effects of the electromagnetic RF radiation.

In this document, various devices and methods are described that deflect, absorb and/or reflect RF radiation away from the body of a mobile phone user through the use of a plate or other structure as a shield. Such devices may significantly reduce the absorption by the user of a portable electronic device of electromagnetic RF radiation emitted by the portable electronic device. In some implementations, the device fits between the mobile phone and a decorative and/or protective case. In other implementations, the device couples directly to the portable electronic device. In still other implementations, the device couples directly to the case or forms a portion of the case itself. In other implementations, the device may couple into a sleeve coupled to a case or directly to the portable electronic device itself.

Figure 1:
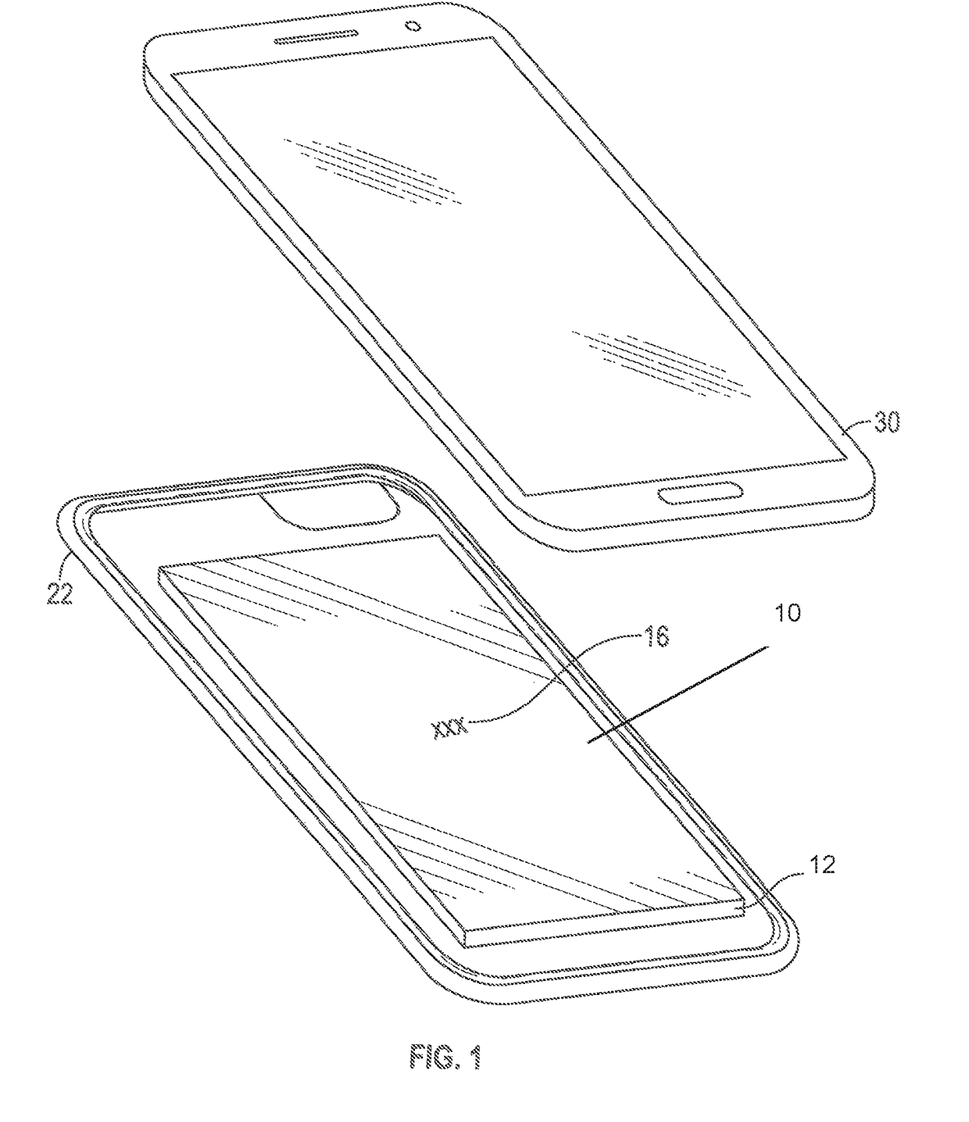
FIG. 1 is a perspective view of an implementation of an RF shielding device positioned within a decorative and/or protective case for a mobile phone.

Referring to FIG. 1, an implementation of an RF shielding device 10 is illustrated. The RF shielding device 10 may include a plate 12. The plate 12 may be formed of a sheet of metallic material. Different metallic materials may be used. For example, aluminum, pre-tin plated steel, alloy 770, or like materials may be used to form the plate 12 of the RF shielding device 10. In various implementations, the plate 12 may be formed of copper. Copper is highly effective in attenuating magnetic and electrical waves thereby allowing the RF shielding device 10 to reduce the electromagnetic radiation emitted from the mobile phone 30.

The RF shielding device 10 may be formed in different sizes. The size of the RF shielding device 10 may be based on the size of the mobile phone 30 and the location of antennas within the mobile phone 30. For example, some mobile phones 30 may have one or more antennas located only in one area such as in the top or bottom of the mobile phone 30. Thus, the RF shielding device 10, and hence the plate 12, may be sized to cover a lower and/or upper area of the mobile phone 30. In the implementation illustrated, the plate 12 may be sized and dimensioned similarly to the shape of a credit card. However, some mobile phones 30 may have multiple antennas located at the top and bottom of the mobile phone 30. For example, some mobile phones have four antennas, where one antenna is located in each corner (upper left, upper right, lower left and lower right corners). For these types of mobile phones 30, the plate 12 may be sized to cover the entire rear surface of the mobile phone 30. The above sizings and dimensions are given as non-limiting examples. Other configurations may be developed using the principles disclosed herein. For example, a small cut out may be formed on the RF shielding device 10 to prevent the RF shielding device 10 from obscuring a camera lens opening formed in the mobile phone 30.

When copper is used for forming the plate 12, the copper plate 12 may have a tendency to corrode. Copper corrosion may occur when the copper plate 12 is exposure to the atmosphere/air. Copper oxidization may cause the copper plate 12 to tarnish. After some time, the copper plate 12 may turn to a dark brown or black color, and finally to green. The oxidation of the copper plate 12 may cause the RF shielding device 10 to disfigure/damage the mobile phone 30.

Figure 4:
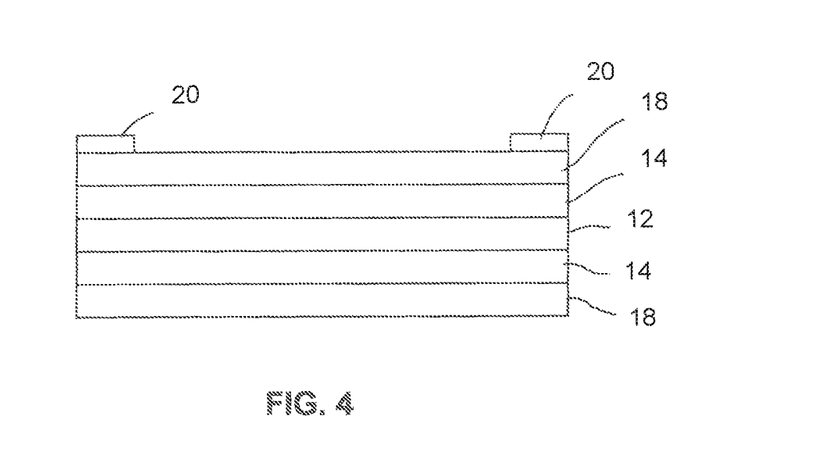
FIG. 4 is a cross-sectional view of an implementation of an RF shielding device for a mobile phone.

Referring to FIG. 4, because of the oxidization issue, the plate 12 may be powder coated. Powder coating is a process wherein a coating 14 may be electrostatically applied to the plate 12 and then cured under heat forming the coating 14 over the plate 12. The coating 14 may be a thermoplastic or a thermoset polymer and may come in any color. The coating 14 may create a hard finish on the plate 12 that is tougher and more effective in preventing corrosion than conventional paint.

Different text, design and/or other indicia 16 (FIG. 1) may be formed on the plate 12 after the coating 14 has been applied. The text, design and/or other indicia 16 may allow one to personalize the RF shielding device 10. A clear coat 18 may be applied over the coating 14.

A slip resistant material 20 may be applied to the clear coat 18. The slip resistant material 20 may keep the RF shielding device 10 from sliding and moving as may be disclosed below.

Figure 2:
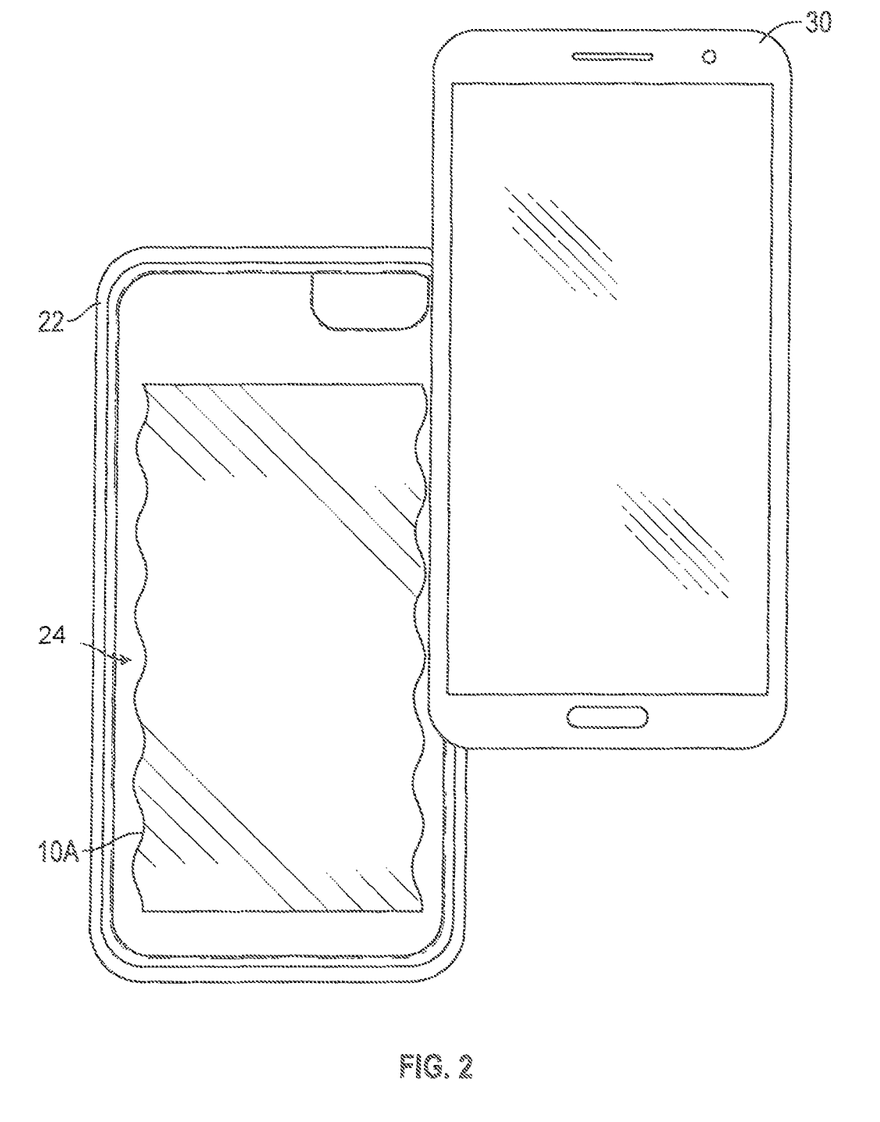
FIG. 2 is a front view of another implementation of an RF shielding device positioned within a decorative and/or protective case for a mobile phone.
Figure 3:
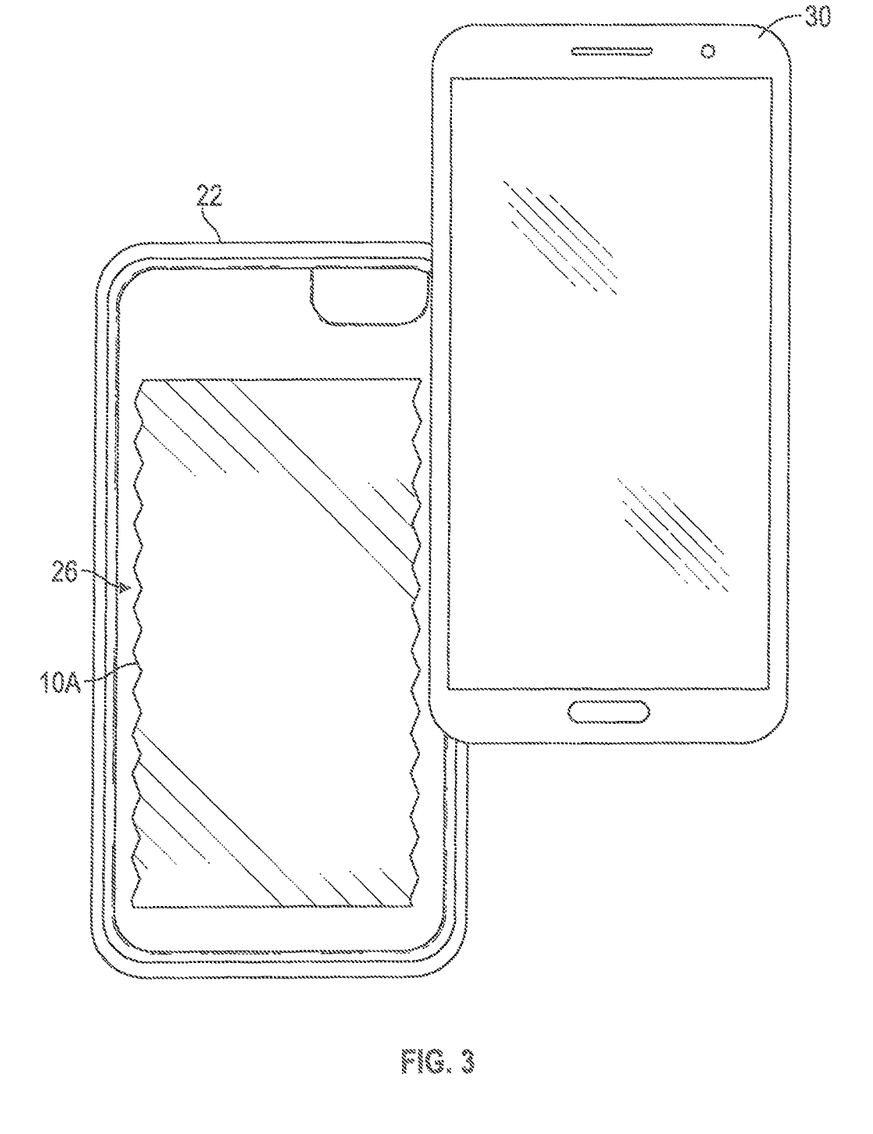
FIG. 3 is a front view of another implementation of an RF shielding device positioned within a decorative and/or protective case for a mobile phone.

Referring to FIGS. 1-3, the RF shielding device 10 may be formed in different sizes, shapes and configurations. FIG. 1 illustrates an implementation where the RF shielding device 10 may be rectangular in shape and may have a sufficient thickness to keep the RF shielding device 10 positioned between the mobile phone 30 and a decorative and/or protective cover 22 as will be discussed below. In accordance with one embodiment, the RF shielding device 10 may have a thickness of around $1/32$ to $1/8$ of an inch. In accordance with one embodiment, the RF shielding device 10 may have a thickness of about $1/128$th to about $1/8$th of an inch. The device may also be formed of a foil or a metal tape in various implementations. In such implementations, the thickness of the material may be between about 0.001 mm to about 6.5 mm. In some implementations, the thickness of the material may be thicker than 6.5 mm.

The RF shielding device 10 may be formed to have a wave configuration 24 formed on the edges 10A (top, bottom, left and right side edges) of the RF shielding device 10 as may be seen in FIG. 2. The RF shielding device 10 may be formed to have a saw tooth configuration 26 formed on the edges 10A (top, bottom, left and right side edges) of the RF shielding device 10 as may be seen in FIG. 3. The wave configuration 24 and the saw tooth configuration 26 formed on the edges 10A may affect the levels of the electromagnetic radiation emitted from the mobile phone 30. The wave configuration may be present on one or more sides of the device in various implementations.

In operation, for those implementations where the RF shielding device is placed between the cover and a mobile phone, a user wishing to reduce electromagnetic radiation emitted from the user's mobile phone 30 may need to determine the location of the one or more antennas within the mobile phone 30. When the user determines the location of the antennas, the user may position the RF shielding device 10 on a rear surface of the mobile phone 30 such that the RF shielding device 10 is positioned over the area where the antennas may be located. The user may position the RF shielding device 10 so that the slip resistant material 20 is placed against the rear surface of the mobile phone 30. This may prevent the RF shielding device 10 from shifting and moving around. The decorative and/or protective cover 22 may then be placed onto the mobile phone 30 securing the RF shielding device 10 between the mobile phone 30 and the decorative and/or protective cover 22.

The RF shielding device 10 is designed to reflect and/or deflect electromagnetic radiation emitted from the mobile phone 30. As the RF shielding device 10 fits between the mobile phone 30 and the decorative and/or protective cover 22 and is easily transferable. This may allow a user of the RF shielding device 10 to change out and use any decorative and/or protective cover 22 he/she may want with the RF shielding device 10 in order to be able to deflect the electromagnetic radiation from the mobile phone 30.

Various implementations of RF shielding devices have been disclosed in this document up to this point. These implementations and the additional implementations disclosed in this document show plates where no part, piece, or portion of the plate is located within a case of the portable electronic device itself. As previously discussed, these devices may be dimensioned to fit between a cover and a portable electronic device, may couple to the portable electronic device itself, or may be a part of a cover design. The electronic devices that the devices disclosed herein may be employed with may be, by non-limiting example, mobile electronic devices, cell phones, mobile phones, phablets, tablets, laptops, smart watches, heart monitors, movable medical devices, and any other movable electronic device which involves RF radiation. In the remaining portions of this document, various RF shielding device designs will be discussed. While they may be discussed in the context of being coupled directly to a portable electronic device or to a cover, it must be understood that these device designs could also be utilized between a cover and portable electronic device as well.

Figure 5:
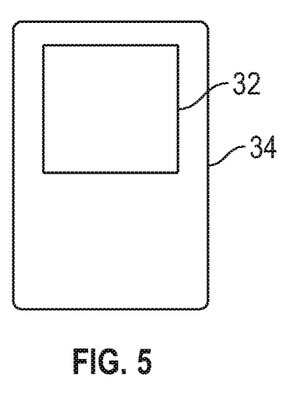
FIG. 5 is a front view of a first implementation of an RF shielding device coupled directly to a portable electronic device.

Referring to FIG. 5, a first implementation of an RF shielding device 32 is illustrated coupled to a portable electronic device 34 (which in this case is a mobile phone). In the implementation illustrated, the RF shielding device 32 is directly coupled to the surface of the portable electronic device 34 which does not include a cover in this implementation (though one could be used if desired). As illustrated, the RF shielding device 32 is positioned to cover at least one antenna of the portable electronic device 34 but is smaller than the perimeter of the portable electronic device 34 itself. In this implementation of an RF shielding device (as in all other RF shielding device implementations disclosed herein), the material of the RF shielding device may be any material that is capable of deflecting, absorbing, or reflecting electromagnetic radio frequency radiation emitted and received by the portable electronic device. In particular implementations, the material of the RF shielding device may be, by non-limiting example, a metal, copper, gold, silver, platinum, nickel, aluminum, ferrite, any alloy of the foregoing, and any combination of the foregoing. The RF shielding device takes the form of a plate in the implementation illustrated in FIG. 5. In other implementations, non-metallic/ non-metal compounds like ceramics, composites, graphene, carbon fiber, shungite, plastics, polymers, and any other non-metallic materials capable of deflecting, absorbing, or reflecting electromagnetic radio frequency radiation emitted by the portable electronic device may be used in various implementations. For those materials that are metals or non-metals, particular crystallographic orientations and/ or planes of the material may be utilized to maximize or otherwise create the desired deflecting, absorbing, or reflecting effect for the RF radiation.

The implementation illustrated in FIG. 5 may be coupled to the rear surface of the portable electronic device through a wide variety of coupling mechanisms. Non-limiting examples of coupling mechanisms that may be used in various implementations include adhesives, hook and loop fasteners, screws, snaps, double sided tape, polymers, suction cups, magnetics, glue, or any other coupling system or material capable of holding two pieces together. The RF shielding device 32 may not be coated in some implementations. In other implementations, the device 32 may include any coating disclosed in this document, including, by non-limiting example, an electroplated coating, a ceramic coating, an electroless plated coating, a paint utilizing a wet or dry carrier, a rubber coating, a metal coating, a metal filing coating, a magnetic coating, a clear coating, or a powder coating. As previously discussed in this document, multiple layers of one or any of the coatings disclosed in this document may be utilized in various implementations. Also, metals and other RF shielding materials may be applied as coatings, such as, by non-limiting example, metal on metal coatings, metal filings incorporated in a coating, conductive paints, non-conductive paints, and a coating of any other material type disclosed herein that has an RF deflecting, absorbing, or reflecting effect. Fabrics and other woven materials could also be used as coatings in various implementations.

Figure 6:
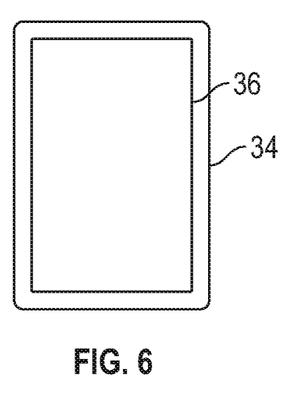
FIG. 6 is a front view of a second implementation of an RF shielding device coupled directly to a portable electronic device.
Figure 8:
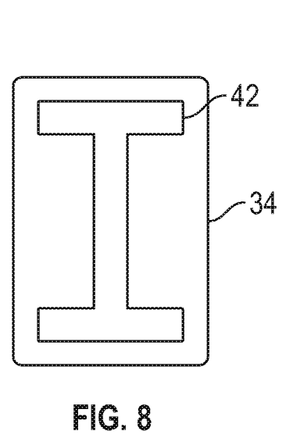
FIG. 8 is a front view of a fourth implementation of an RF shielding device coupled directly to a portable electronic device.
Figure 9:
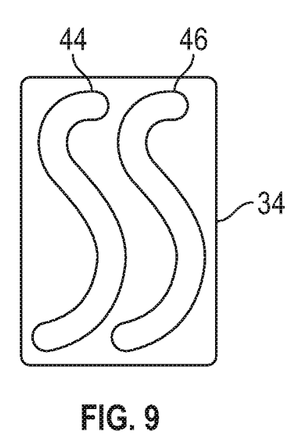
FIG. 9 is a front view of a fifth implementation of an RF shielding device coupled directly to a portable electronic device.
Figure 10:
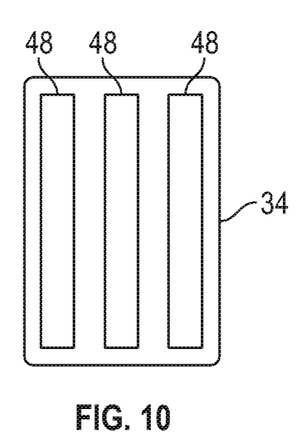
FIG. 10 is a front view of a sixth implementation of an RF shielding device coupled directly to a portable electronic device.
Figure 11:
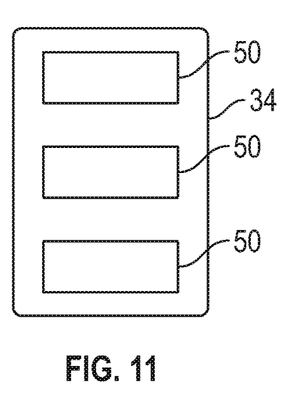
FIG. 11 is a front view of a seventh implementation of an RF shielding device coupled directly to a portable electronic device.
Figure 12:
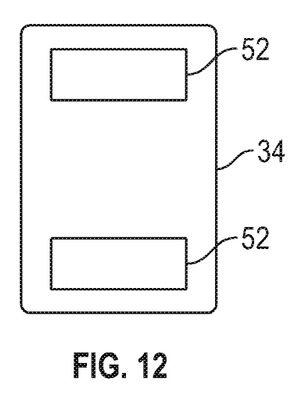
FIG. 12 is a front view of an eighth implementation of an RF shielding device coupled directly to a portable electronic device.
Figure 13:
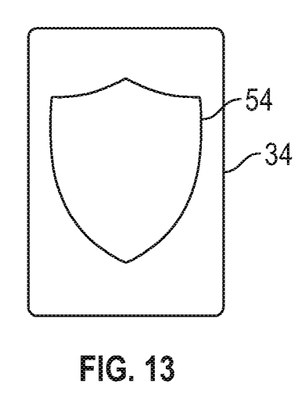
FIG. 13 is a front view of a ninth implementation of an RF shielding device coupled directly to a portable electronic device.

The design of the particular plate used as the RF shielding device 32 may take many forms in various implementations. Referring to FIG. 6, an implementation of a RF shielding device/plate 36 is illustrated that has a perimeter size close to the same size as, or coextensive with, the perimeter of the rear surface of the portable electronic device 34. In other implementations, the shape of the plate may be the same size as the perimeter of the rear surface of the portable electronic device. In other implementations, the plate may actually overlap and extend around the rear surface onto the side surfaces of the portable electronic device. In some implementations, the plate may wrap around to the front side of the portable electronic device across one or more sides of the portable electronic device. The actual shape of the perimeter of the plate may be any closed shape, including any disclosed in this document. FIGS. 8 and 13 illustrate plate designs that are not polygonal and include protruding sections (in the case of plate 42 in FIG. 8) and irregular shapes in the case of plate 54 of FIG. 13. The plate may include one or more apertures therethrough. In some implementations the one or more apertures may accommodate cameras, fingerprint readers, power buttons or other portions of the portable electronic device.

Figure 7:
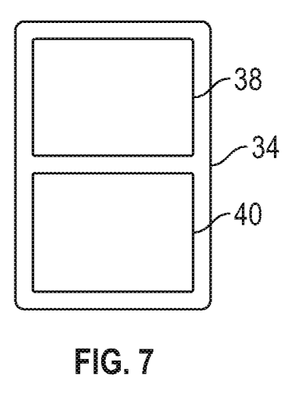
FIG. 7 is a front view of a third implementation of an RF shielding device coupled directly to a portable electronic device.

Plate implementations used in RF shielding devices may include more than one portion/section. Referring to FIG. 7, a plate with two sections 38, 40 is illustrated. While the two sections 38, 40 are illustrated as being the same size, or substantially the same size, in various implementations the relative size of the two or more portions of the plate may differ. FIGS. 9, 10, 11, and 12 illustrate various multiple portion plate implementations, demonstrating that the portions may include curved sections/portions 44, 46 and that the various portions may be arranged on the rear surface of the portable electronic device 34 in various orientations vertically (portions 48) and horizontally (portions 50 and 52). Also, while in the figures the portions are arrange symmetrically about an axis of the portable electronic device, in other implementations, the portions may not be arranged symmetrically.

Figure 14:
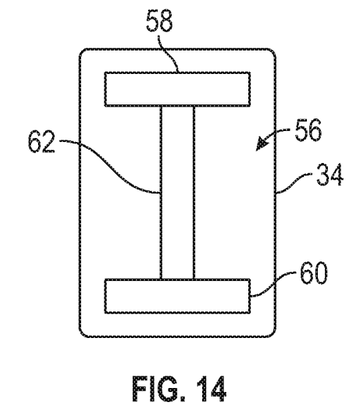
FIG. 14 is a front view of a tenth implementation of an RF shielding device coupled directly to a portable electronic device.

For those plate implementations where multiple portions are utilized, the multiple portions may be coupled individually to the rear surface of the portable electronic device using any coupling system disclosed herein. In other implementations, the portions may be coupled together using other portions. Referring to FIG. 14, and implementation of a plate 56 is illustrated where the plate 56 is formed of three sections 58, 60, and 62 coupled together. In this implementation, sections 58 and 60 are metallic and section 62 is made of a non-metallic material that acts to couple the two sections 58 and 60 together. In particular implementations, the sections may be made of any combination of metallic and/or non-metallic materials. In various implementations, the non-metallic portion may include a variety of structures made of various materials, such as, by non-limiting example, a binder, a support, a plastic support/portion, a rubber support, a polymer support, a wood support, a carbon fiber support, a resin support, a glass reinforced epoxy laminate support (FR-4), an adhesive, a glue, a molding compound, or any other material or structure capable of coupling the multiple sections of the plate together. In various implementations, the portions may be joined together using a wide variety of methods including molding, forming, gluing, joining, injection molding, and any other technique for coupling the sections with the material of the non-metallic portion. In various implementations, the non-metallic portion may actually include some metal components, like metal filings or metal layers as disclosed herein.

In various implementations where multiple sections are used, all of the sections may be made of metal-containing materials. In these implementations the metal-containing sections may be joined together using, by non-limiting example, gluing, welding, bonding, or any other technique for bonding metal-containing materials.

Figure 15:
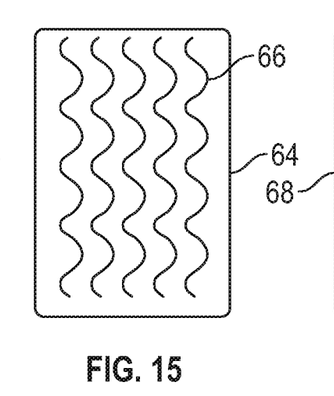
FIG. 15 is a front view of an eleventh implementation of an RF shielding device.
Figure 16:
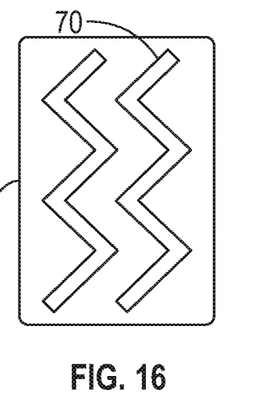
FIG. 16 is a front view of a twelfth implementation of an RF shielding device.
Figure 17:
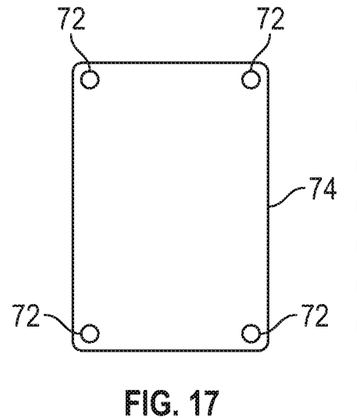
FIG. 17 is a front view of a thirteenth implementation of an RF shielding device.

The various plate designs disclosed in this document may also include fully planar portions substantially parallel with the back surface of the portable electronic device. In other implementations, however, a wide variety of non-planar shapes may be incorporated into one or more surfaces of the plate. Referring to FIG. 15, a plate 64 with a plurality of raised waved projections 66 in the material of the plate is illustrated. In various implementations, the waved projections may be, by non-limiting example, lines, diagonals, partial lines, individual projections, irregular arranged projections and any of the foregoing may have any type of surface finish including, by non-limiting example, smooth, rough, jagged, angled, alternating, and any other surface shape, The waved projections 66 may be formed through molding, casting, milling, stamping, punching, or otherwise forming the surface of the plate 64. Referring to FIG. 16, a plate 68 is illustrated with two zig zag depressions 70 formed therein using any of the previously mentioned techniques. The depressions may take the shape of any of the shapes of the projections mentioned herein and may include any of the surface finish types of the projections mentioned herein. The size and arrangement and other characteristics of the projections and depressions may be designed to aid in attenuation/absorption/reflection of the RF radiation. However, in other implementations, like the one illustrated in FIG. 17, the projections 72 may serve simply to raise the surface of the plate 74 above any surface on which the plate is resting to prevent scratching of the plate 74 and/or surface in contact with the plate. In other implementations, projections like those illustrated in FIG. 17 may be on both sides of the plate to allow air or other circulation to occur beneath the plate between the portable electronic device and the plate.

Figure 20:
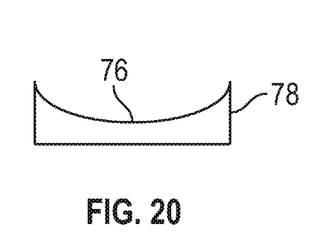
FIG. 20 is a cross sectional view of a fourteenth implementation of an RF shielding device.
Figures 21, 22:
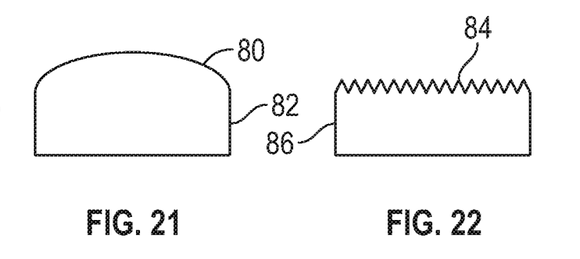
FIG. 21 is a cross sectional view of a fifteenth implementation of an RF shielding device.
FIG. 22 is a cross sectional view of a sixteenth implementation of an RF shielding device.
Figure 23:
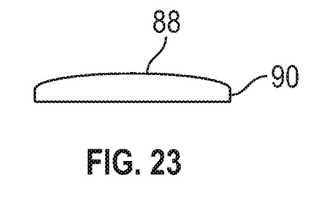
FIG. 23 is a side view of a seventeenth implementation of an RF shielding device.
Figures 24, 25:
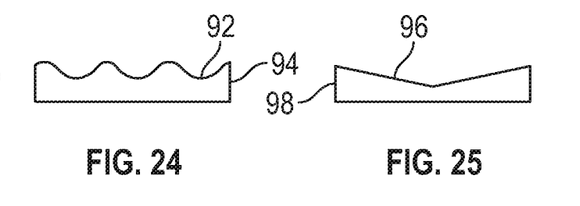
FIG. 24 is a side view of an eighteenth implementation of an RF shielding device.
FIG. 25 is a side view of a nineteenth implementation of an RF shielding device.

FIGS. 20-25 illustrate various other non-planar shapes that may be incorporated into plate designs. FIG. 20 illustrates a concave shape 76 incorporated into/across the cross section of the plate 78. FIG. 21 illustrates a convex shape 80 incorporated into the cross section of the plate 82. FIG. 22 illustrates an alternating shape 84 incorporated into the cross section of the plate 86. The particular dimensions of the shapes 76, 80, and 84 incorporated into the cross section of the plate may aid in the attenuation/absorption/reflection of the RF radiation from the portable electronic device. FIGS. 23-25 illustrate other non-planar shapes incorporated into a longest dimension of the plate (longitudinal dimension of the plate). FIG. 23 illustrates a concave shape 88 incorporated into the longitudinal dimension of the plate 90. FIG. 24 illustrates a waved shape 92 incorporated into the longitudinal dimension of the plate 94. FIG. 25 illustrates a valley shape 96 incorporated into the longitudinal dimension of the plate 98. In various implementations, any combination of cross sectional shapes and longitudinal shapes may be combined or used in various plate and plate portion designs. The particular dimensions of the various cross sectional and longitudinal shapes may be determined/calculated by the degree of attenuation/absorption/reflection desired of the RF radiation from the plate for the portable electronic device. The various shapes of the plates disclosed in this document can be made via, by non-limiting example, stamping, punching, casting, forming, and any other method of shaping a metallic or non-metallic material. The shapes in various implementations of plates may be functional in that they may affect RF radiation, or parts of the shapes may be decorative or ornamental, or both functional and decorative/ornamental.

Figure 30:
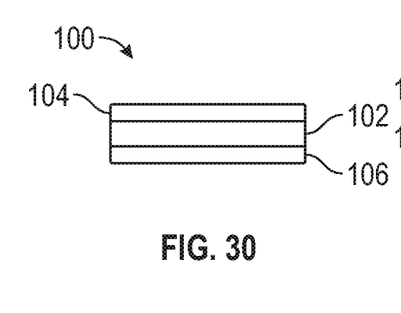
FIG. 30 is a first cross sectional view of an implementation of an RF shielding device.
Figure 31:
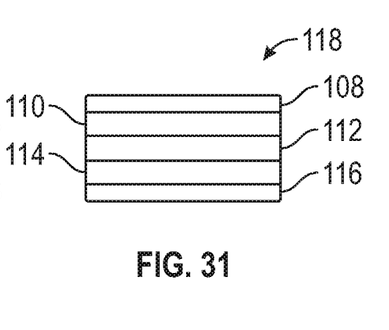
FIG. 31 is a second cross sectional view of an implementation of an RF shielding device.

Many of the various plate implementations disclosed in this document are made of a single unitary material (such as a piece of metal). Various coatings have been disclosed that may be used to coat the plate. In various implementations, however, the plate itself may be made of various layered materials separate from the coatings applied to the plate. Referring to FIG. 30, a cross sectional view of an implementation of a plate 100 is illustrated. As illustrated, in this implementation, the plate 100 includes an inner layer 102 that is made of a non-metal/non-metallic material, such as any non-metal material disclosed in this document. Two layers 104, 106 of metal or metal-containing material (which may be any metal or metal-containing material disclosed in this document) sandwich the inner layer 102. The two layers 102, 106 may be, by non-limiting example, glued, plated, spray painted, spray coated, deposited, painted, dipped, brushed, electrostatically coated, or otherwise coupled to the inner layer 102. The use of the two discrete metal layers 102, 106 may assist with attenuation/reflection/absorption of RF radiation from the portable electronic device in various implementations. Additional numbers of metal and non-metal layers (or additional metal layers may be used in various implementations. For example, referring to FIG. 31, five layers of metal 108, 110, 112, 114, and 116 are illustrated stacked in a cross section of plate 118. Each layer may be the same type of metal or a different type of metal or metal-containing material, depending on the attenuation/reflection/absorption effect desired from the plate 118. More than five layers of metal could be used in various implementations. Also, in various implementations, various stacked and sandwiched non-metal layers may be included in the cross section of various plate implementations. Any of the metal, metal-containing, and non-metal materials disclosed herein may be utilized in such implementations. For example, a layer of ferrite filings may be painted on either side of the non-metal inner layer, or a layer of metallic tape may be applied on either side of the inner layer.

FIG. 30 illustrates the case where the inner layer is a non-metal material. In other implementations, the inner layer may be a metal material instead and the outer two layers may be formed of any of the coating materials disclosed in this document. In some implementations, both layers may be made of non-metal materials. Two or more layers of metals, non-metals, and any combination thereof may be used in some implementations.

Figure 32:
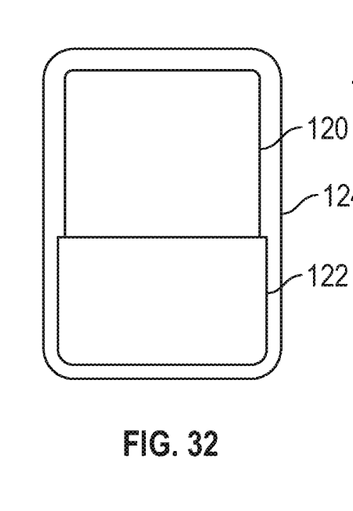
FIG. 32 is a front view of a twentieth implementation of an RF shielding device directly coupled with a portable electronic device.
Figure 33:
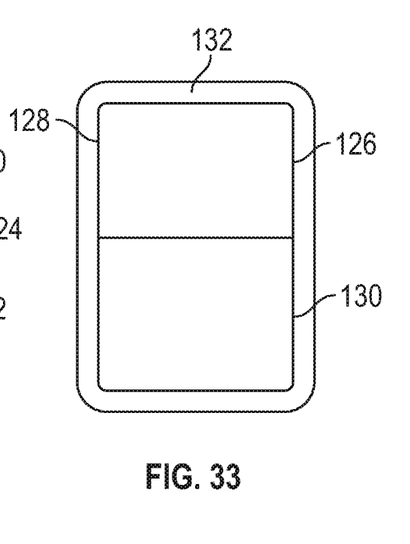
FIG. 33 is a front view of a twenty-first implementation of an RF shielding device directly coupled with a portable electronic device.

The use of various coating types and layers of coatings has been disclosed in this document. In various plate implementations the coatings may cover only a portion of the plate, like the plate 120 illustrated in FIG. 32. Plate 120 has only a portion of the plate covered by coating 122. Partially coated plates may be useful where only a part of the plate needs protection from corrosion or where the coating material itself has an independent effect on RF radiation from the portable electronic device 124 to which the plate 120 is coupled (either inside a cover, or directly coupled). In some implementations, the use of multiple coatings that are not layered may be used, as illustrated in FIG. 33, where the plate 126 has a first coating 128 and a second coating 130 covering separate portions of the plate 126. Like the implementation in FIG. 31, this technique may be used where the coatings have different purposes or different effects on RF radiation from the portable electronic device 132 to which the plate 126 is coupled.

Figures 26, 27:
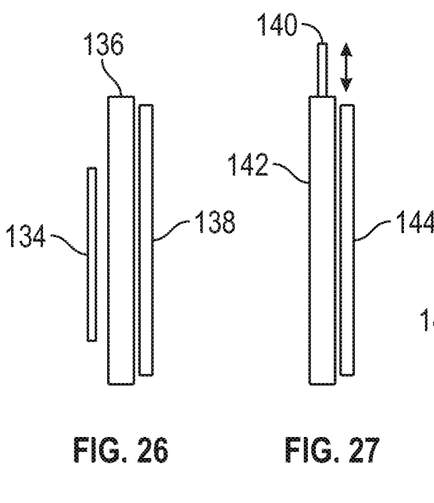
FIG. 26 is a side view of a first implementation of an RF shielding device, a case, and a portable electronic device.
FIG. 27 is a side view of a second implementation of an RF shielding device, a case, and a portable electronic device.

The various plate implementations and RF shielding devices disclosed in this document have been illustrated to be used between a cover and a back surface of a portable electronic device or directly coupled to the back surface of a portable electronic device. In particular implementations, a plate 134 may be coupled directly to cover 136 coupled with the portable electronic device 138, as illustrated in FIG. 26. The coupling may take place using any of the coupling system and methods disclosed in this document. In other implementations, as illustrated in FIG. 27, a plate 140 may be slidably coupled into a recess in a cover 142 which is then coupled over the rear surface of a portable electronic device 144. When slid in, the plate 140 may be held in position through, by non-limiting example, latches, snaps, fasteners, clips, flaps, or any mechanism to hold a structure in a pocket permanently or non-permanently. Such implementations may provide flexibility for the user to identify the particular degree of RF shielding effect they desire and use the corresponding plate. While the cover 142 in FIG. 27 is illustrated as being larger than the portable electronic device 138, in other implementations it may be smaller and attach to the portable electronic device with the plate slid into the cover 142. In other implementations, however, the plate may not be slid into the cover 142 but may be positioned between the smaller cover and the phone similar to other implementations disclosed herein. In these implementations the cover may take the form of a plastic clip that hold the plate against the rear surface of the portable electronic device as the clip engages over the edges of the portable electronic device.

Figure 28:
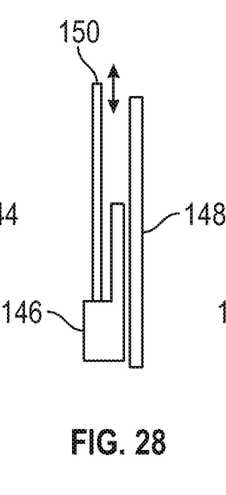
FIG. 28 is a side view of a third implementation of an RF shielding device, a case, and a portable electronic device.
Figure 29:
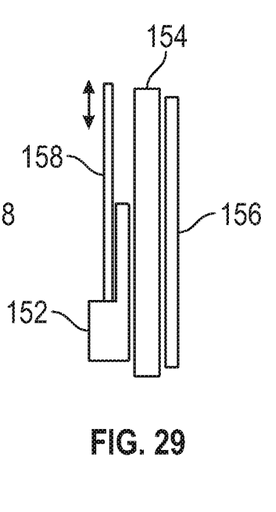
FIG. 29 is a side view of a fourth implementation of an RF shielding device, a case, and a portable electronic device.

In still other implementations, no cover may be used, but instead a sleeve 146 may be coupled directly to the back surface of the portable electronic device 148 as illustrated in FIG. 28. A plate 150 is then slidably coupled into the sleeve 146 (from any orientation relative to the portable electronic device (top, bottom, left, right, or diagonally). In some implementations, the plate 158 may be thereafter permanently attached to the sleeve 152, leaving at least a portion of the plate 150 exposed. In other implementations, the plate 150 may not be exposed after being slid into the sleeve 146. In a similar way, a sleeve 152 can be coupled directly to a cover 154 coupled to a portable electronic device 156 as illustrated in FIG. 29. A plate 158 is then slidably coupled into the sleeve 152 from any orientation relative to the portable electronic device (top, bottom, left, right, or diagonally). In some implementations, the plate 158 may be thereafter permanently attached to the sleeve 152. Any of the plate implementations disclosed in this document could be used in the implementations illustrated in FIGS. 26-29. A wide variety of materials may be employed for the various sleeve implementations, including, by non-limiting example, plastic, leather, cloth, rubber, metal-containing, and any other material that can slidably hold the plate therein.

Figure 34:
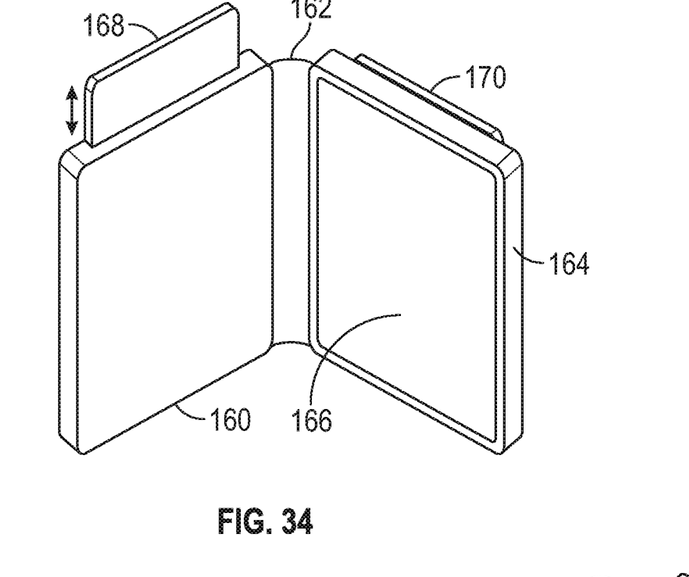
FIG. 34 is a perspective view of an implementation of a case coupled with a portable electronic device having two RF shielding devices.

In various implementations of covers, certain covers have been devised that allow a flap portion of the cover to rest over a front surface of a portable electronic device while the device is in use or not in use. The flap portion can be rotated away from the front surface when desired. FIG. 34 illustrates an implementation of such a cover, where flap 160 is hingedly coupled via hinge 162 to the portion 164 of the cover that is coupled over the rear surface of the portable electronic device 166. As illustrated, in various implementations, a plate 168 may be slidably coupled into the flap 160 to provide RF shielding from the front side of the portable electronic device 166 during use. In other implementations, the plate 168 may be sewn, glued, or formed into the flap 160. Also as illustrated, a plate 170 may be coupled directly to the back of the portion 164 of the cover that is over the rear surface of the portable electronic device (or inside the cover or between the cover and the rear surface of the portable electronic device). While the use of the plate 170 is illustrated in FIG. 34, in other implementations, the plate 170 may be omitted, and the function of that plate duplicated by allowing the flap 160 (and the plate 168) to rotate over the rear surface of the portion 164 of the cover while the portable electronic device is in use or not in use. In this way, the flexibility of use of the plate may be increased.

Figures 35, 36:
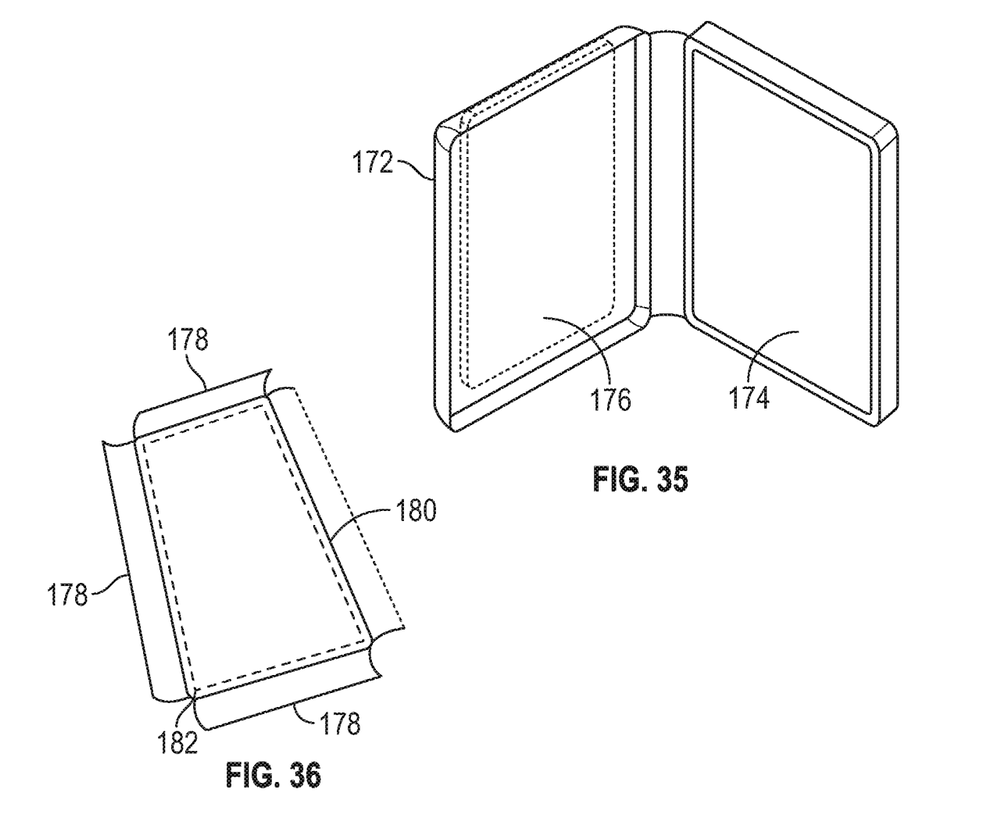
FIG. 35 is a perspective view of another implementation of a case coupled with a portable electronic device with an RF shielding device embedded therein.
FIG. 36 is a perspective view of a flap of an implementation of a cover.

In other cover implementations, the design of the flap 172 (as illustrated in FIG. 35) may take more the form of a shell which encloses at least a portion of the front and the side surfaces of the portable electronic device 174 when the flap 172 is closed over the front surface of the device 174. As illustrated, a plate 176 may be included inside the structure of the flap 172 (or slidably coupled as in the implementation illustrated in FIG. 34). In some implementations, the RF shielding material of the plate 176 may extend into one or more the sides of the shell, thus providing an RF shielding effect over at least a portion of the sides of the portable electronic device 174. While the use of a closed, fixed shell design for the flap 172 is illustrated in FIG. 35, in other implementations, the shell may be formed by one or more additional curved flaps 178 that extend from the main flap 180 as illustrated in FIG. 36. The one or more additional curved flaps 178 may have openings in them. When the main flap 180 is closed over the front face of the portable electronic device, the curved flaps 178 then close over at least a portion of the sides of the portable electronic device. As RF shielding materials may be included in the curved flaps 178, the effect of the curved flaps 178 may be similar to the flap 172. In some implementations, the hinge of the flap 172 may also include RF shielding materials. A plate 182 is included in the structure of the main flap 180. Any of the plate implementations disclosed in this document may be utilized in cover implementations illustrated in FIGS. 34-36. In some implementations, the material of the entire flap 172 may be made of a metal-containing material. In other implementations, no separate plate may be used where the entire flap 172 is made of a metal-containing material, but the flap 172 acts as the plate. In other implementations, a front face opposite the side of the flap that faces the front face of the portable electronic device may be made of, by non-limiting example plastic, glass, or any other optically transmissive material. In these implementations, the optically transmissive material may include a metal-containing portion as well.

The flaps in FIGS. 34 and 35 may be held over the front face of the portable electronic device using a magnetic coupler or other fastener type.

Various plate implementations like those disclosed herein may be attached to the rear surface of any portable electronic device using bendable or fixed form clips or projections on the plate itself which couple around the sides of the portable electrical device. In these implementations as in other implementations disclosed herein, a padding material may be coupled to the plate itself between the portable electronic device and the plate or on the outer surface of the plate.

Figures 18, 19:
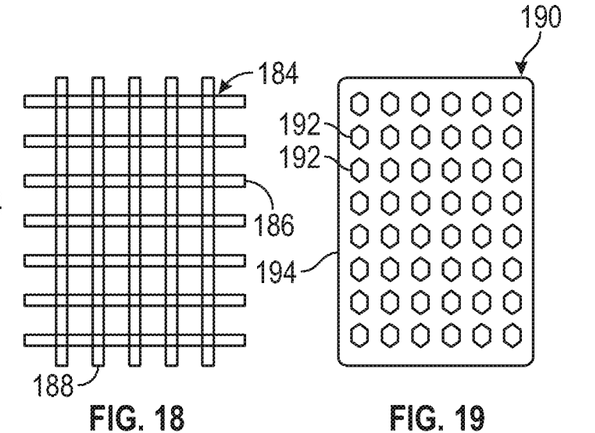
FIG. 18 is a front view of a first mesh implementation of an RF shielding device.
FIG. 19 is a front view of a second mesh implementation of an RF shielding device.

While the use of continuously distributed materials in the form of plates and various supports has been disclosed thus far in this document, RF shielding devices like those disclosed herein may utilize dispersed material designs. Referring to FIG. 18, an example of such a dispersed material design in the form of a mesh 184 is illustrated. As illustrated, mesh 184 is composed of a plurality of perpendicularly oriented members 186, 188 coupled together through, by non-limiting example, interweaving, gluing, welding, soldering, or any other method of coupling two substantially perpendicularly arranged materials together. In various implementations, the plurality of perpendicularly oriented members 186, 188 may include a metal or metal-containing material like any disclosed herein. In some implementations, the perpendicularly oriented members 186, 188 may made of the same material; in others, one set of similarly oriented members may be made of a different material than the other perpendicularly aligned set, including non-metal materials. In some implementations, some of each set of similarly aligned members may be made of two or more different materials, including non-metal materials. In some implementations, the ends of the perpendicularly oriented members may be left free (like the implementation illustrated in FIG. 18). In others, an edging, frame, or edge bar may be used to secure the ends of the perpendicularly oriented members. In various implementations, the members may not be perpendicularly or substantially perpendicularly oriented but may be oriented in a wide variety of angles relative to each other.

FIG. 19 illustrates a mesh 190 that is formed by a plurality of spaced closed shaped openings 192 formed through a sheet of material 194. In the case illustrated in FIG. 19, the openings are hexagons, though the openings may be any closed shape in various implementations, nor need they all be the same size or area in the sheet in various implementations. The sheet 194 of material may be any metal or metal-containing material disclosed in this document or other material affecting RF radiation from a portable electronic device disclosed in this document. The sizing of the openings formed in the various mesh implementations disclosed in this document may be determined by the desired degree of deflection, absorption, or reflection of RF radiation from the portable electronic device desired.

The various mesh implementations disclosed in this document may be used in place of any of the plate and cover implementations disclosed in this document. In some implementations, a mesh implementation may be used in combination with a plate implementation, depending on the desired effect on the RF radiation from the portable electronic device. Also, mesh implementations may be employed that are incorporated into any of the coating implementations disclosed herein as well in various implementations. A wide variety of possible applications for various meshes may be constructed using the principles disclosed in this document. Multiple meshes of the same type or different types disclosed herein may be used in concert in any of the implementations disclosed herein including with one or more plates.

In places where the description above refers to particular implementations of devices for reflecting, deflecting, and/or absorbing electromagnetic radiation emitted from an portable electronic device and related methods and implementing components, sub-components, methods and sub-methods, it should be readily apparent that a number of modifications may be made without departing from the spirit thereof and that these implementations, implementing components, sub-components, methods and sub-methods may be applied to other devices for reflecting, deflecting, and/or absorbing electromagnetic radiation emitted from a portable electronic device and other related methods.

What is claimed is:

1. A device used with a mobile electronic device, the device comprising:
   a metal-containing plate configured to be directly attached to a rear surface of a mobile electronic device, the metal-containing plate comprising a coating;
   wherein the metal-containing plate is configured to deflect, absorb, or reflect electromagnetic radio frequency radiation emitted by the mobile electronic device away from a user of the mobile electronic device and;
   wherein the metal-containing plate comprises a perimeter that forms any closed shape.

2. The device of claim 1, wherein the metal-containing plate is one of smaller than, coextensive with, or the same dimension as a perimeter of the rear surface of the mobile electronic device.

3. The device of claim 1, wherein the metal-containing plate comprises a non-planar surface on a largest surface of the metal-containing plate.

4. The device of claim 1, wherein the metal-containing plate comprises a material selected from the group consisting of copper; gold; silver; platinum; nickel; aluminum; ferrite; shungite; any radio frequency attenuating, absorbing, or reflecting material; and any combination thereof.

5. The device of claim 1, wherein the coating is selected from the group consisting of an electroplated coating, an electroless plated coating, a paint including a wet or dry carrier, a rubber coating, a metal coating, a metal filing coating, a magnetic coating, a clear coating, a ceramic coating, a powder coating, and any combination thereof.

6. The device of claim 1, wherein the metal-containing plate comprises two or more layers wherein one of the two or more layers is either a metallic material or a non-metallic material and a second one of the two or more layers is either a non-metallic material or a metallic material.

7. The device of claim 1, further comprising a coupling mechanism on the metal-containing plate, the coupling mechanism configured to couple the metal-containing plate directly to the rear surface of the mobile electronic device, the coupling mechanism selected from the group consisting of an adhesive, hook and loop fasteners, screws, snaps, double sided tape, polymers, suction cups, magnetics, and any combination thereof.

8. A device used with a mobile electronic device, the device comprising:
a plate configured to be directly attached to a rear surface of a mobile electronic device or coupled between a cover and the rear surface of the mobile electronic device, the plate comprising at least two portions; and
a coating, wherein the coating is selected from the group consisting of an electroplated coating, an electroless plated coating, a paint including a wet or dry carrier, a rubber coating, a ceramic coating, a metal coating, a metal filing coating, a magnetic coating, a clear coating, a powder coating, and any combination thereof;
wherein a material of at least one of the at least two portions of the plate is configured to deflect, absorb, or reflect electromagnetic radio frequency radiation emitted by the mobile electronic device away from a user of the mobile electronic device.

9. The device of claim 8, wherein the plate comprises at least two metal-containing portions.

10. The device of claim 8, wherein the at least two portions of the plate are coupled together through a non-metallic portion or metallic portion.

11. The device of claim 8, wherein the non-metallic portion is selected from the group consisting of a binder, a support, a plastic support, a rubber support, a polymer support, a wood support, a carbon fiber support, a resin support, a glass reinforced epoxy laminate support, an adhesive, a glue, a molding compound, and any combination thereof.

12. The device of claim 8, wherein at least one of the at least two portions of the plate comprises two or more layers wherein one of the two or more layers is either a metallic material or a non-metallic material and a second one of the two or more layers is either a non-metallic material or a metallic material.

* * * * *